(12) United States Patent
Kobayashi

(10) Patent No.: US 12,044,094 B2
(45) Date of Patent: Jul. 23, 2024

(54) PLUG, DOWNHOLE TOOL, AND WELL TREATMENT METHOD

(71) Applicant: KUREHA CORPORATION, Tokyo (JP)

(72) Inventor: Takuma Kobayashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 18/247,816

(22) PCT Filed: Oct. 11, 2021

(86) PCT No.: PCT/JP2021/037498
§ 371 (c)(1),
(2) Date: Apr. 4, 2023

(87) PCT Pub. No.: WO2022/075484
PCT Pub. Date: Apr. 14, 2022

(65) Prior Publication Data
US 2023/0374880 A1    Nov. 23, 2023

(30) Foreign Application Priority Data
Oct. 9, 2020   (JP) ................. 2020-171457

(51) Int. Cl.
*E21B 33/12*   (2006.01)
*E21B 33/134*  (2006.01)

(52) U.S. Cl.
CPC ............ *E21B 33/12* (2013.01); *E21B 33/134* (2013.01)

(58) Field of Classification Search
CPC .... E21B 33/12; E21B 33/134; E21B 33/1208; E21B 33/128; E21B 33/129; C08G 63/06; C08K 5/3442; C08K 5/29; C08L 101/16
See application file for complete search history.

(56) References Cited

U.S. PATENT DOCUMENTS 9,127,527 B2   9/2015  Frazier
9,267,351 B2   2/2016  Okura et al.
(Continued)

FOREIGN PATENT DOCUMENTS

JP   2015-160872 A   9/2015
JP   2017-200985 A   11/2017
(Continued)

OTHER PUBLICATIONS

English Translation of International Preliminary Report on Patentability and Written Opinion mailed Apr. 20, 2023, in PCT/JP2021/037498.
(Continued)

*Primary Examiner* — Steven A MacDonald
(74) *Attorney, Agent, or Firm* — Birch, Stewart, Kolasch & Birch, LLP (57) ABSTRACT

A plug that can maintain isolation also in a high-temperature and low salt concentration fluid or water only for a predetermined period of time is provided. A plug for temporarily preventing circulation of a fluid in a well includes or composed of a resin molded article, the resin molded article being formed from a polyglycolic acid resin composition containing a polyglycolic acid and a cyclic carbodiimide compound and having a carbodiimide group concentration of 15 eq/t or greater.

13 Claims, 2 Drawing Sheets

(56) References Cited

U.S. PATENT DOCUMENTS

| | | |
|---|---|---|
| 9,932,796 B2 | 4/2018 | Walton et al. |
| 10,655,041 B2 | 5/2020 | Usova et al. |
| 2009/0318628 A1* | 12/2009 | Tanaka ................. C08G 63/912 |
| | | 525/419 |
| 2011/0224385 A1* | 9/2011 | Shoji .................... C07D 273/08 |
| | | 525/437 |
| 2013/0079450 A1 | 3/2013 | Sato |
| 2013/0240201 A1 | 9/2013 | Frazier |
| 2015/0051119 A1 | 2/2015 | Masaki et al. |
| 2015/0096741 A1 | 4/2015 | Okura et al. |
| 2015/0105521 A1* | 4/2015 | Shoji ....................... C08L 67/04 |
| | | 525/437 |
| 2015/0376373 A1* | 12/2015 | Shoji ....................... C08K 5/29 |
| | | 525/450 |
| 2016/0145483 A1* | 5/2016 | Lecerf ................... C09K 8/516 |
| | | 166/387 |
| 2016/0298017 A1* | 10/2016 | Takahashi ............... E21B 43/26 |
| 2017/0284169 A1 | 10/2017 | Walton et al. |
| 2017/0342306 A1 | 11/2017 | Usova et al. |
| 2017/0369708 A1 | 12/2017 | Kokel et al. |

FOREIGN PATENT DOCUMENTS

| | | |
|---|---|---|
| WO | 2011/152199 A1 | 12/2011 |
| WO | 2013/183363 A1 | 12/2013 |
| WO | 2015/072317 A1 | 5/2015 |
| WO | 2015/199647 A1 | 12/2015 |

OTHER PUBLICATIONS

Extended European Search Report for European Application No. 21877783.7, dated Feb. 12, 2024.

* cited by examiner

PLUG, DOWNHOLE TOOL, AND WELL TREATMENT METHOD

TECHNICAL FIELD

The present invention relates to a plug, a downhole tool, and a well treatment method.

BACKGROUND ART

Examples of well treatment operations performed to recover hydrocarbon resources from the ground include fracturing and well washing. When fracturing is performed, isolation needs to be performed to prevent circulation of a fluid in a well using a downhole tool or a plug. In addition, when washing of the well, stimulation of a subterranean formation, and the like are performed before fracturing, a flow path of a fluid for washing needs to be isolated with a downhole tool to prevent a fluid before washing from mixing with a fluid after washing during washing operation. Furthermore, an opening part needs to be provided by degrading a specific position of the downhole tool such that, after washing, hydraulic pressure can be applied to the well wall to stimulate a subterranean formation.

Furthermore, these downhole tools all need to be quickly removed in some way after well treatment. Downhole tools or plugs are thus required to be capable of maintaining the isolation only for a predetermined period of time.

In this regard, Patent Document 1 discloses a method of treating a well using particles of a degradable material containing a stabilizer. Patent Document 2 discloses that degradation of a resin is prevented when concentration of acidic groups of the resin is low, while degradation of a resin is promoted when concentration of acidic groups of the resin is high. Patent Document 3 discloses a molded article of a polyglycolic acid resin, the article having a constant rate of reduction in thickness in water over time. Patent Document 4 discloses a treatment method using a tool provided with a plug having corrosive properties in an electrolyte.

CITATION LIST

Patent Literature

Patent Document 1: US 2017/0342306 B
Patent Document 2: JP 2015-160872 A
Patent Document 3: WO 2013/183363
Patent Document 4: WO 2015/199647

SUMMARY OF INVENTION

Technical Problem

However, the prior arts as described above are not techniques to degrade a molded article in water, the molded article being thick enough to withstand the pressure when fracturing is performed. Furthermore, no prior arts as described above disclose a specific degradation retardant and a composition that are effective in reducing the rate of reduction in thickness. In addition, a polyglycolic acid has a higher hydrolysis reaction rate at a higher ambient temperature, and thus a plug including a component made of a polyglycolic acid has a problem that it may fail to maintain the isolation for a target period of time in a high-temperature well. Moreover, in a plug including a corrosive metal component, a corrosion rate strongly depends on a salt (electrolyte) concentration in the fluid, and the corrosion is slow in a low salt concentration fluid or water. Thus, a plug including a corrosive metal component has a problem that such a plug may fail to eliminate the isolation even after a lapse of a target period of time.

Thus, there is a demand for a plug that maintains the isolation for a sufficient period of time even in a high-temperature well but can reliably eliminate the isolation even in a low salt concentration fluid or water.

The present invention has been made in view of the problems described above, and an objective of the present invention is to provide a plug that can maintain isolation also in a high-temperature and low salt concentration fluid or water only for a predetermined period of time.

Solution to Problem

To solve the problems described above, a plug according to the present invention is a plug for temporarily preventing circulation of a fluid in a well, the plug including or composed of a resin molded article, the molded article being formed from a polyglycolic acid resin composition containing a polyglycolic acid and a cyclic carbodiimide compound and having a carbodiimide group concentration of 15 eq/t or greater.

In addition, a downhole tool according to the present invention includes a tubular main body and the plug described above, in which the tubular main body has an opening part in a circumferential surface of the tubular main body, the opening part communicating between an inside and an outside of the tubular main body, and the plug is engaged with the tubular main body to close the opening part.

A well treatment method according to the present invention includes: temporarily isolating one or more areas of at least one of a well or a downhole tool using the plug described above; and
  degrading the resin molded article of the plug to eliminate the isolation and change a flow path of a fluid in the one or more areas.

The well treatment method according to the present invention includes: installing the plug described above in a well to prevent a flow of a fluid in the well; and
  degrading the resin molded article to restore the flow of the fluid.

The well treatment method according to the present invention includes: introducing a downhole tool into a well, the downhole tool having a first opening part at a leading edge and a second opening part at a trailing edge, and further having a third opening part between the leading edge and the trailing edge, the third opening part plugged by the plug described above;
  injecting a fluid from a ground into the downhole tool through the first opening part and discharging the fluid from the second opening part into the well to wash the well; and
  degrading the resin molded article of the plug after the washing and enabling circulation of a fluid between an inside and an outside of the downhole tool through the third opening part.

Advantageous Effects of Invention

The plug according to the present invention can maintain the isolation function also in a high-temperature and low salt concentration fluid or water only for a predetermined period of time.

DESCRIPTION OF EMBODIMENTS

1. Plug

A plug according to the present embodiment refers to a component or a device to be used to temporarily prevent circulation of a fluid in a well. The plug can be in any form, as long as it is to be used to temporarily prevent circulation of a fluid in a well, and can be, for example, a ball, a dart, a disk, a screw, a frac plug, a bridge plug, or a packer.

The plug according to the present embodiment includes a resin molded article formed from a polyglycolic acid resin composition or is composed of a resin molded article formed from a polyglycolic acid resin composition. Here, the phrase "composed of a resin molded article" means that the plug does not contain a constituent feature other than the resin molded article.

In a case where the plug includes a resin molded article formed from a polyglycolic acid resin composition, as long as degradation of the resin molded article enables elimination of the prevention of circulation of a fluid, the resin molded article is not limited to use in a specific constituent feature. Details of specific examples of the plug will be described later.

A shape of the resin molded article is not particularly limited and is appropriately designed according to the plug or a component in the plug to be applied.

Polyglycolic Acid Resin Composition

The resin molded article to be used in the plug of the present embodiment is formed from a polyglycolic acid resin composition. The polyglycolic acid resin composition in the present embodiment contains a polyglycolic acid and a cyclic carbodiimide compound. In addition, a concentration of a carbodiimide group in the polyglycolic acid resin composition is 15 eq/t or greater. The "cyclic carbodiimide compound" in the present specification refers to a cyclic carbodiimide compound that has not reacted with a polyglycolic acid unless otherwise specified.

A content of the cyclic carbodiimide compound is preferably 0.4 mass % or greater in the polyglycolic acid resin composition. The content of the cyclic carbodiimide compound can be appropriately adjusted according to a time duration for maintaining the isolation desired for the resin molded article formed from the composition, and the like. From the viewpoint of more reliably reducing the rate of reduction in thickness of the molded article, the content of the cyclic carbodiimide compound is more preferably 0.7 mass % or greater and even more preferably 1 mass % or greater. In addition, from the viewpoint of stably melt-kneading the polyglycolic acid resin composition, the content of the cyclic carbodiimide compound is preferably 30 mass % or less and more preferably 25 mass % or less.

The polyglycolic acid used in the polyglycolic acid resin composition according to the present embodiment is a polymer containing a repeating unit represented by —(—O—CH$_2$—CO—)—. The polyglycolic acid may be a homopolymer of glycolic acid or a copolymer of glycolic acid and other monomer components. Examples of other monomer components used in the copolymer include hydroxycarboxylic acids such as L-lactic acid, D-lactic acid, 3-hydroxybutanoic acid, and 1-hydroxyhexanoic acid, an ester compound composed of a diol and a dicarboxylic acid, such as a condensate of 1,4-butanediol and succinic acid and a condensate of 1,4-butanediol and adipic acid, cyclic esters and lactones produced by intramolecular condensation of the other monomer components described above, and cyclic carbonates such as trimethylene carbonate.

In a case where the polyglycolic acid is a copolymer of glycolic acid and another monomer component, the content of the structural unit derived from glycolic acid is 70 mol. % or greater, preferably 80 mol. % or greater, and more preferably 90 mol. % or greater.

In a case where the polyglycolic acid is a copolymer of glycolic acid and another monomer component, a melt viscosity of the copolymer is preferably less than a melt viscosity of a glycolic acid homopolymer having the same molecular weight as that of the copolymer. With the copolymer with such a melt viscosity, there is no need to set the temperature high when melting in a case of solidification- and extrusion-molding or injection molding using the polyglycolic acid resin composition, and also the decrease in the molecular weight of the polyglycolic acid can be prevented. Thus, a downhole tool component with an intended high strength can be obtained.

In a case where the polyglycolic acid is a homopolymer, a weight average molecular weight of the homopolymer is preferably greater than 20000. The homopolymer with a weight average molecular weight of greater than 20000 ensures water vapor barrier properties of the polyglycolic acid. This can retard the penetration of water into the resin molded article used in the plug and thus can avoid bulk degradation of the plug. In addition, from the viewpoint of obtaining an intended high-strength downhole tool component, the weight average molecular weight of the polyglycolic acid homopolymer is preferably 50000 or greater, more preferably 70000 or greater, and even more preferably 150000 or greater. An upper limit of the weight average molecular weight of the polyglycolic acid homopolymer is not particularly limited, but from the viewpoint of enabling solidification- and extrusion-molding or injection molding, the upper limit is typically preferably 500000 or less and more preferably 300000 or less.

End blocks of the polyglycolic acid are preferably capped with cyclic carbodiimide compounds. Here, the phrase "end blocks of the polyglycolic acid are capped with a cyclic carbodiimide compounds" is intended that the polyglycolic acid has a structure formed by reaction of the carboxyl groups at the end blocks of the polyglycolic acid and cyclic carbodiimide compounds. In a case where the end blocks of the polyglycolic acid are capped with cyclic carbodiimide compounds, not all the end blocks of the polyglycolic acid are necessarily capped.

In a case where at least some of end groups of the polyglycolic acid are capped with cyclic carbodiimide compounds, the concentration of the carboxyl end groups of the polyglycolic acid contained in the polyglycolic acid resin composition is preferably 10 eq/t or less, more preferably 8 eq/t or less, and even more preferably 6 eq/t or less. A lower limit of the concentration of the carboxyl end groups of the polyglycolic acid is not particularly limited, but the concentration is typically about 0.1 eq/t or greater. With the concentration of the carboxyl end groups of the polyglycolic acid in the above range, degradation of the polyglycolic acid can be prevented in a well environment.

The concentration of the carboxyl end groups of the polyglycolic acid contained in the polyglycolic acid resin composition can be calculated by titration using a neutralization reaction. Specifically, the following method can be given as an example. That is, the polyglycolic acid resin composition is dissolved in a solvent, such as DMSO, and a pH indicator is added thereto. An alkaline solution is added dropwise to the solution, while the color change of the mixed solution is observed. The dropwise addition is terminated when the color change of the mixed solution is no longer observed, and the carboxyl group concentration is calculated from the amount of the alkaline solution added dropwise. For the alkaline solution, for example, a DMSO solution of 1,8-diazabicyclo[5,4,0]undec-7-ene can be used. The substrate concentration of the alkaline solution can be appropriately adjusted according to the carboxyl end group concentration of the polyglycolic acid.

For the cyclic carbodiimide compound for capping the end blocks, the same compound as the cyclic carbodiimide compound contained in the polyglycolic acid resin composition can typically be used, but the compound need not necessarily be the same compound.

With the end blocks of the polyglycolic acid capped with cyclic carbodiimide compounds, degradation of the polyglycolic acid can be prevented in a well environment.

The cyclic carbodiimide compound contained in the polyglycolic acid resin composition in the present embodiment is a compound having a cyclic structure in which the first nitrogen and the second nitrogen of a carbodiimide group are bonded by a bonding group. The cyclic carbodiimide compound can be represented, for example, by Formula (I) below.

[Chemical Formula 1]

(I)

In Formula (I), R is one or more divalent bonding groups selected from the group consisting of aliphatic groups, alicyclic groups, and aromatic groups. In Formula (I), R may contain one or more heteroatoms. Examples of the heteroatom include oxygen (O), nitrogen (N), sulfur (S), and phosphorus (P). Further, R may contain a ring structure, and the ring structure may contain a carbodiimide structure. The kind and number of atoms constituting a main chain of the cyclic structure can be appropriately determined as long as the effects of the present embodiment can be achieved. For example, the number of atoms directly constituting the cyclic structure is preferably 8 or more and more preferably 10 or more. In addition, the number of the atoms is preferably 50 or less and more preferably 20 or less.

Further, R may further have a monovalent substituent as long as the effects of the present embodiment can be achieved. More specifically, R may be a di- to tetra-valent aliphatic group having 1 to 20 carbon atoms, a di- to tetra-valent alicyclic group having 3 to 20 carbon atoms, a di- to tetra-valent aromatic group having 5 to 15 carbon atoms, or a combination thereof. Examples of the combination include alkylene-arylene groups in which an alkylene group and an arylene group are bonded.

Examples of the aliphatic group in R include alkylene groups having 1 to 20 carbon atoms, alkanetriyl groups having 1 to 20 carbon atoms, and alkanetetrayl groups having 1 to 20 carbon atoms.

Examples of the alkylene groups include a methylene group, an ethylene group, a propylene group, a butylene group, a pentylene group, a hexylene group, a heptylene group, an octylene group, a nonylene group, a decylene group, a dodecylene group, and a hexadecylene group.

Examples of the alkanetriyl groups include a methanetriyl group, an ethanetriyl group, a propanetriyl group, a butanetriyl group, a pentanetriyl group, a hexanetriyl group, a heptanetriyl group, an octanetriyl group, a nonanetriyl group, a decanetriyl group, a dodecanetriyl group, and a hexadecanetriyl group.

Examples of the alkanetetrayl groups include a methanetetrayl group, an ethanetetrayl group, a propanetetrayl group, a butanetetrayl group, a pentanetetrayl group, a hexanetetrayl group, a heptanetetrayl group, an octanetetrayl group, a nonanetetrayl group, a decanetetrayl group, a dodecanetetrayl group, and a hexadecanetetrayl group.

Examples of the alicyclic group in R include cycloalkylene groups having 3 to 20 carbon atoms, cycloalkanetriyl groups having 3 to 20 carbon atoms, and cycloalkanetetrayl groups having 3 to 20 carbon atoms.

Examples of the cycloalkylene groups include a cyclopropylene group, a cyclobutylene group, a cyclopentylene group, a cyclohexylene group, a cycloheptylene group, a cyclooctylene group, a cyclononylene group, a cyclodecylene group, a cyclododecylene group, and a cyclohexadecylene group.

Examples of the cycloalkanetriyl groups include a cyclopropanetriyl group, a cyclobutanetriyl group, a cyclopentanetriyl group, a cyclohexanetriyl group, a cycloheptanetriyl group, a cyclooctanetriyl group, a cyclononanetriyl group, a cyclodecanetriyl group, a cyclododecanetriyl group, and a cyclohexadecanetriyl group.

Examples of the cycloalkanetetrayl groups include a cyclopropanetetrayl group, a cyclobutanetetrayl group, a cyclopentanetetrayl group, a cyclohexanetetrayl group, a cycloheptanetetrayl group, a cyclooctanetetrayl group, a cyclononanetetrayl group, a cyclodecanetetrayl group, a cyclododecanetetrayl group, and a cyclohexadecanetetrayl group.

Examples of the aromatic group in R include arylene groups having 5 to 15 carbon atoms, arenetriyl groups having 5 to 15 carbon atoms, and arenetetrayl groups having 5 to 15 carbon atoms. The aromatic group may contain one or more heteroatoms.

Examples of the arylene groups include a phenylene group and a naphthalenediyl group.

Examples of the arenetriyl group (trivalent) include a benzenetriyl group and a naphthalenetriyl group.

Examples of the arenetetrayl groups (tetravalent) include a benzenetetrayl group and a naphthalenetetrayl group.

Examples of the substituent that R may have include alkyl groups having 1 to 20 carbon atoms, aryl groups having 6 to 15 carbon atoms, halogen atoms, nitro groups, amide groups, hydroxyl groups, ester groups, ether groups, and aldehyde groups.

Among the cyclic carbodiimide compounds described above, using a compound having only one carbodiimide group in one cyclic structure is preferred from the viewpoint of preventing deterioration of the working environment caused by the characteristic odor of the isocyanate compound. This is because the cyclic carbodiimide of the above structure does not release a compound having an isocyanate group even if it reacts with the carboxyl group at the end of the polyglycolic acid.

Examples of the cyclic carbodiimide compound described above include a compound represented by Formula (II) or Formula (III) below.

[Chemical Formula 2]

(II)

[Chemical Formula 3]

(III)

The polyglycolic acid resin composition can contain, in addition to the cyclic carbodiimide compound described above, a derivative of the cyclic carbodiimide compound that is produced, for example, by reaction with the carboxyl end group of the polyglycolic acid.

In addition, the carbodiimide group contained in the polyglycolic acid resin composition is a structure represented by Formula (IV) below.

(IV)

A concentration of the carbodiimide groups in the polyglycolic acid resin composition according to the present embodiment is 15 eq/t or greater. The concentration can be appropriately selected according to the time for maintaining the isolation required for the resin molded article of the present embodiment. For example, from the viewpoint of reducing the rate of reduction in thickness of the resin molded article of the present embodiment, the concentration is preferably 18 eq/t or greater, more preferably 30 eq/t or greater, and even more preferably 50 eq/t or greater. In addition, from the viewpoint of maintaining the tensile strength of the resin molded article of the present embodiment at 80 MPa or greater, the concentration is preferably 900 eq/t or less, more preferably 800 eq/t or less, and even more preferably 650 eq/t or less. With the concentration of the carbodiimide groups in this range, a plug that can maintain the isolation in a high-temperature environment for a desired period of time can be achieved.

The concentration of the carbodiimide end groups contained in the polyglycolic acid resin composition can be calculated, for example, by 1H NMR measurement using dimethyl sulfone as a standard substance.

The polyglycolic acid resin composition according to the present embodiment may contain an additional additive, such as a thermal stabilizer, an antioxidant, an impact resistance modifier, a cross-linker, an organic filler, an inorganic filler, and a colorant, unless the desired effects of the plug according to the present embodiment are impaired.

In a case where the cyclic carbodiimide compounds are contained in the polyglycolic acid resin composition, hydrolysis of the polyglycolic acid contained in the composition is prevented. The hydrolysis is further prevented as the content of the carbodiimide compound increases. This is because water also reacts with carbodiimide groups, and thus water is more consumed in the reaction with carbodiimide groups as more carbodiimide groups are present in the polyglycolic acid resin composition, consequently reducing water involved in the hydrolysis of the polyglycolic acid.

The polyglycolic acid resin composition according to the present embodiment has a carbodiimide group concentration of 15 eq/t or greater, and thus this can moderately prevent the hydrolysis of the polyglycolic acid contained in the resin molded article in a high-temperature well environment, the resin molded article formed from the composition. Thus, such a resin molded article can maintain the isolation in a high-temperature environment for a desired period of time. In the present specification, the "high-temperature" is intended to mean a temperature of 80° C. or higher.

On the other hand, even with a resin molded article formed from a polyglycolic acid resin composition not containing the cyclic carbodiimide compound, the time for maintaining the isolation can be extended by increasing the thickness of the resin molded article. However, due to a design constraint on a downhole tool, the thickness cannot be specified solely based on the consideration of the degradation. Under such a constraint, using the resin molded article according to the present embodiment can achieve the same time duration for maintaining the isolation with the reduced thickness of the plug compared to the thickness of the plug when using a polyglycolic acid resin composition not containing the cyclic carbodiimide compound. Consequently, this can increase the flexibility and degree of freedom in the design of a downhole tool. For example, in a case of a plug that is inserted into a tubular component during use, as shown in an aspect of the plug described later, if the thickness of a tubular main body can be reduced according to the thickness of the plug, the inner diameter of a downhole tool can be increased. This results in increased transport efficiency of a fluid. Application of the plug of the present embodiment can also contribute to such an increased transport efficiency of a fluid.

Method of Producing Molded Article

The resin molded article according to the present embodiment can be produced by mixing the polyglycolic acid and the cyclic carbodiimide compound and by solidification- and extrusion-molding or injection molding of the mixture. The mixture can be prepared by melt-kneading the polyglycolic acid and the cyclic carbodiimide compound and pelletizing the melt-kneaded product. When the compounds are melt-kneaded, the temperature is preferably from 220 to 280° C. and more preferably from 230 to 260° C. from the viewpoint of preventing thermolysis of the polyglycolic acid.

In addition, mixing the polyglycolic acid and the cyclic carbodiimide compound at the temperature described above allows reaction of some of the cyclic carbodiimide compound and carboxyl groups at the end of the polyglycolic acid. Consequently, the end blocks of the polyglycolic acid is capped with the cyclic carbodiimide compound.

The amount of the cyclic carbodiimide compound added to the polyglycolic acid is preferably 2 parts by mass or greater, more preferably 3 parts by mass or greater, and even more preferably 4 parts by mass or greater per 100 parts by mass of the polyglycolic acid. When the molded article is produced by solidification- and extrusion-molding or injection molding, or when the polyglycolic acid and the cyclic carbodiimide compound are melt-kneaded and pelletized, some of the added cyclic carbodiimide compound react with the end carboxyl group(s) of the polyglycolic acid and are used to cap the polyglycolic acid. A portion of the remaining cyclic carbodiimide compound is degraded or disappeared by heat. Adjusting the amount of the cyclic carbodiimide compound added as described above can adjust the concentration of the carbodiimide group in the resulting resin molded article to 15 eq/t or greater. In addition, the content of the cyclic carbodiimide compound in the resin molded article can also be adjusted to 0.4 mass % or greater. The amount of the cyclic carbodiimide compound added has no upper limit, but the upper limit can be, for example, 30 parts by mass or less and even 20 parts by mass or less.

It is noted that, in general, when 20 parts by mass of a low molecular weight compound is added to form a resin molded article, the tensile strength of the resin molded article may be reduced readily. However, the resin molded article according to the present embodiment is formed by adding the cyclic carbodiimide compound, and no decrease in tensile strength is observed even if the added amount of the cyclic carbodiimide compound is 30 parts by mass. Thus, even if a large amount of the cyclic carbodiimide compound is added, the resulting resin molded article can be suitably used in a downhole tool or its constituent feature that is required to have strength.

A temperature when the resin molded article is solidification- and extrusion-molded or injection-molded is preferably from 220 to 280° C. and more preferably from 230 to 260° C.

Degradation of Resin Molded Article

The resin molded article according to the present embodiment includes a resin molded article formed from the polyglycolic acid resin composition or is composed of a resin molded article formed from the polyglycolic acid resin composition and thus suitably degrades in a low salt concentration fluid or water. When the resin molded article according to the present embodiment is immersed in water, hydrolysis due to the water reduces the molecular weight of the polyglycolic acid in the surface part of the resin molded article. This results in embrittlement of the surface part of the resin molded article. Water readily permeates into the polyglycolic acid that has a reduced molecular weight. Thus, the polyglycolic acid is gradually hydrolyzed from the surface part of the resin molded article to the center part, and the embrittlement of the resin molded article progresses accordingly. When the molecular weight of the polyglycolic acid with a reduced molecular weight is further reduced due to further hydrolysis, the polyglycolic acid elutes an oligomer or glycolic acid, which is a product of the hydrolysis, in water, and consequently the resin molded article loses shape. The resin molded article is thus ultimately degraded. The degradation of the resin molded article eliminates the isolation by the resin molded article.

In the present specification, the time duration starting from the time when the resin molded article is immersed in water to the time when the polyglycolic acid in the surface part in the molded article is hydrolyzed and the thickness of the molded article starts to decrease is referred to as "degradation lead time". The resin molded article retains its shape that it had immediately before the immersion in water, at least until the degradation lead time lapses since the immersion in water.

In addition, the phenomenon in which the resin molded article becomes brittle due to the decrease in molecular weight of the polyglycolic acid caused by the hydrolysis of the polyglycolic acid is referred to as "embrittlement". The part of the resin molded article that becomes brittle is referred to as a brittle layer.

The degradation lead time and the rate of progress of embrittlement of the resin molded article when the resin molded article is immersed in water at 80° C. depend on the hydrolysis rate of the polyglycolic acid and can be appropriately adjusted according to a desired time for maintaining the isolation. Hereinafter, unless otherwise specified, "the hydrolysis rate of the polyglycolic acid and the rate of progress of embrittlement of the resin molded article" are simply described as "degradation rate".

A preferred degradation lead time when the resin molded article is immersed in water at 80° C. depends on the design of a downhole tool to which the resin molded article is applied and thus cannot be specified. However, from the viewpoints of increasing the time for maintaining the isolation and reducing the volume of the resin molded article, a longer degradation lead time of the resin molded article is more preferred. A smaller volume of the resin molded article is also preferred from the viewpoint of increasing the flexibility and degree of freedom in the design of a downhole tool.

The degradation lead time may be, for example, 2 hours or more and is more preferably 10 hours or more and even more preferably 16 hours or more. In addition, in this case, the degradation lead time is preferably 72 hours or less, more preferably 48 hours or less, and even more preferably 40 hours or less.

The degradation lead time can be extended by increasing the content of the cyclic carbodiimide compound or the concentration of the carbodiimide group in the resin molded article. This is because water molecules that come in contact with the resin molded article first react with the cyclic carbodiimide compound or the carbodiimide group, and thus this prevents the hydrolysis of the polyglycolic acid on the surface of the resin molded article.

In addition, when the resin molded article according to the present embodiment is immersed in water at 80° C. for 48 hours, a center part and a surface part are formed, in which the surface part has a weight average molecular weight smaller than that of the center part. As an example, in the center part of the resin molded article after immersing the resin molded article in water at 80° C. for 48 hours, the polyglycolic acid has a weight average molecular weight of 70000 or greater. On the other hand, in the surface part of the resin molded article after immersing the resin molded article in water at 80° C. for 48 hours, the polyglycolic acid has a weight average molecular weight of 20000 or less.

The thicknesses of the center part and the surface part of the resin molded article after the immersion depend on the entire thickness of the resin molded article but are, for example, as follows. That is, in a case where the thickness of the resin molded article is approximately 5 mm, the difference between the thickness of the center part and the thickness of the resin molded article before the immersion is preferably 0.1 mm or greater, more preferably 0.2 mm or greater, and even more preferably 0.3 mm or greater. In addition, the difference of the thickness is preferably 2.0 mm or less, more preferably 1.9 mm or less, and even more preferably 1.8 mm or less.

The weight average molecular weight of the polyglycolic acid decreases as hydrolysis proceeds. The carboxyl end groups of the polyglycolic acid are acidic and thus function as a hydrolysis catalyst of an ester bond. Thus, the degradation rate differs between the center part and the surface part of the resin molded article. The degradation of the center part and the surface part can also be retarded by, in the same manner as the case for the lead time, increasing the content of the cyclic carbodiimide compound or the concentration of the carbodiimide group in the resin molded article.

In the present specification, the rate of progress of embrittlement of the resin molded article is defined as the rate of reduction in thickness. The rate of reduction in thickness is a rate at which the thickness of a non-brittle part of the resin molded article decreases. The embrittlement proceeds from the surface toward the center of the resin molded article, and the thickness of the non-brittle part decreases from the surface side. Thus, the rate of progress of embrittlement shows a positive correlation with the rate of reduction in thickness.

The resin molded article according to the present embodiment has a rate of reduction in thickness after a lapse of the degradation lead time in water at 80° C. preferably of 0.1 μm/hr or greater, more preferably 1 μm/hr or greater, and even more preferably 5 μm/hr or greater. In addition, the rate of reduction in thickness is preferably less than 64 μm/hr, more preferably less than 61 μm/hr, and even more preferably less than 50 μm/hr.

The resin molded article according to the present embodiment is formed from the polyglycolic acid resin composition. The polyglycolic acid has high water vapor barrier properties. Thus, for water molecules to reach the center part of the resin molded article, water molecules need to first pass through the brittle layer formed by hydrolysis of the surface part. In the resin molded article according to the present embodiment, hydrolysis and embrittlement of the center part do not thus occur until the surface part becomes brittle, and thus the embrittlement does not proceed rapidly.

Furthermore, the resin molded article according to the present embodiment contains the cyclic carbodiimide compound or the carbodiimide group. Water molecules that have passed through the brittle layer first react with the cyclic carbodiimide compound or the carbodiimide group, thus further preventing diffusion of water molecules. This further retards the progress of the embrittlement.

The resin molded article according to the present embodiment can thus retard hydrolysis and embrittlement after a lapse of the degradation lead time and thus can extend the time for maintaining the isolation even under high temperature conditions.

In addition, for the resin molded article according to the present embodiment, adjusting the time for maintaining the isolation maintained by the resin molded article can be more suitably achieved by adjusting the degradation rate of each of the center part and the surface part. Examples include a method including immersing the molded article in water heated in advance to reduce the molecular weight of the polyglycolic acid only in the surface part, and a method including multilayer molding the center part and the surface part using different polyglycolic acid resin compositions. In addition, adjusting the time for maintaining the isolation under a high-temperature condition can also be achieved by adjusting the thickness and shape of the molded article, or by appropriately combining these conditions. The resin molded article according to the present embodiment retains the function as a plug for a target period of time, and after a lapse of the period of time, the degradation is allowed to proceed at a suitable rate also in a low salt concentration fluid (e.g., low salt concentration water). Consequently, this can suppress the degradation to retain the function and simultaneously can also solve the problem of failure to eliminate the isolation even after a lapse of the target period of time.

Other Physical Properties of Resin Molded Article

The resin molded article in the present embodiment has a tensile strength preferably of 80 MPa or greater, more preferably of 90 MPa or greater, and even more preferably of 100 MPa or greater from the viewpoints of withstanding high pressure in a well and maintaining the isolation. In addition, from the viewpoint of facilitating mold processing, the tensile strength is preferably 400 MPa or less, more preferably 370 MPa or less, and even more preferably 350 MPa or less. Here, the tensile strength of the resin molded article is measured by using a type 1A tensile test piece and subjecting the tensile test piece to tensile stress at a rate of 50 mm/min in an environment of 23° C. in accordance with ISO 527.

In addition, the resin molded article in the present embodiment has a compressive yield stress preferably of 100 MPa or greater, more preferably of 110 MPa or greater, and even more preferably of 120 MPa or greater from the viewpoints of preventing plastic deformation against high pressure received in a well and maintaining the isolation. In addition, from the viewpoint of facilitating mold processing, the compressive yield stress is preferably 450 MPa or less, more preferably 420 MPa or less, and even more preferably 400 MPa or less. Here, the compressive yield stress of the resin molded article is measured by using a 5-mm side cubic resin molded article and subjecting the resin molded article to compressive stress at a rate of 1 mm/min with a compression tester in an environment of 23° C.

2. Specific Aspect of Plug

First Aspect of Plug

A first aspect of the plug according to the present embodiment to be described is a plug configured for use in closing an opening part provided in a circumferential surface of a tubular component inserted into a well, the opening part communicating between an inside and an outside of the tubular component. Such a plug can be, for example, a ball, a dart, a disk, a screw, and a packer to be applied to a downhole tool. In addition, examples of the downhole tools to which these plugs of the first aspect are applied include a wash pipe for washing the well and/or stimulating a subterranean formation before fracturing.

Figure 1:
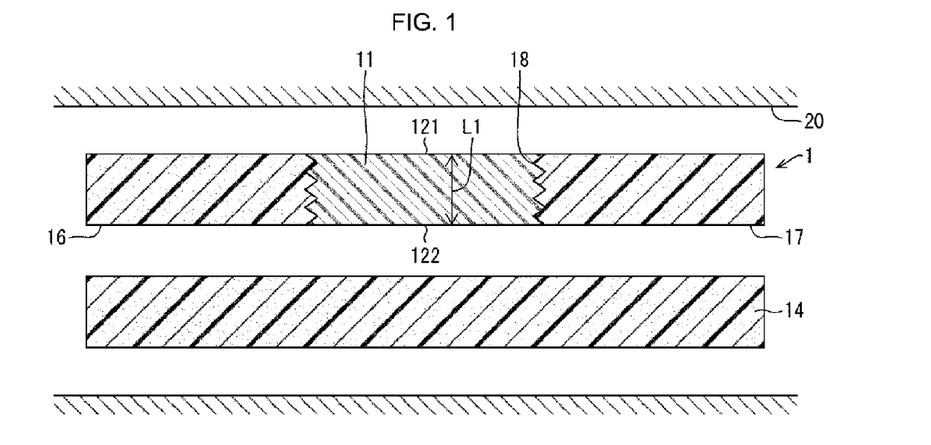
FIG. 1 is a schematic view of a cross section of a downhole tool to which a first aspect of a plug according to an embodiment of the present invention is applied.

An aspect of a case where the plug is a screw configured to be applied to a downhole tool will be described using FIG. 1. FIG. 1 is a schematic view of a cross section of a downhole tool to which the plug according to the first aspect of the present invention is applied.

A downhole tool 1 illustrated in FIG. 1 is inserted into a well and includes a tubular main body 14 as a tubular component. The downhole tool 1 has a first opening part 16 at a leading edge and a second opening part 17 at a trailing edge, and further has one or more third opening part(s) 18 between the leading edge and the trailing edge.

The third opening part 18 is provided in a circumferential surface of the tubular main body 14 and is an opening part communicating between the inside and the outside of the tubular main body 14. Into the third opening part 18, a threaded plug 11 is inserted to close the third opening part 18, and the plug 11 engages with the third opening part. The third opening part 18 of the tubular main body 14 is thus plugged by the plug 11.

Here, the "leading edge" of the downhole tool refers to an edge part located on the inlet side of the well in a state where the downhole tool is set in the well and refers to an edge part on the side to be inserted last when the downhole tool is inserted into the well. The "trailing edge" is an edge part on the opposite side from the leading edge, refers to an edge part located on the back side in the well when the well is viewed from the inlet, and refers to an edge part on the side to be inserted first when the downhole tool is inserted into the well.

As illustrated in FIG. 1, the plug 11 is a threaded plug that closes the opening part provided in the circumferential surface of the tubular component, the opening part communicating between the inside and the outside of the tubular component. The plug 11 is composed of the resin molded article according to the present embodiment.

The plug 11 is inserted into the third opening part 18 of the tubular main body 14, and this prevents a flow of a fluid from the inside toward the outside of the tubular main body 14 through the third opening part 18 accordingly. In addition, when the plug 11 composed of the resin molded article degrades, this eliminates the third opening part 18 accordingly. Consequently, this causes a flow of a fluid from the inside toward the outside of the tubular main body 14 through the third opening part 18.

The size of the plug 11 can vary depending on the thickness of the tubular main body 14 to which the plug 11 is applied, but in an example, the minimum distance L1 between a first surface 121 of the plug 11 and a second surface 122 of the plug 11 can be 6 mm or longer and 65 mm or shorter, the first surface 121 being exposed to the outside of the tubular main body 14, the second surface 122 being exposed to the inside of the tubular main body 14, in a state where the plug 11 is inserted into the tubular main body 14.

Modified Example 1 of First Aspect

Figure 2:
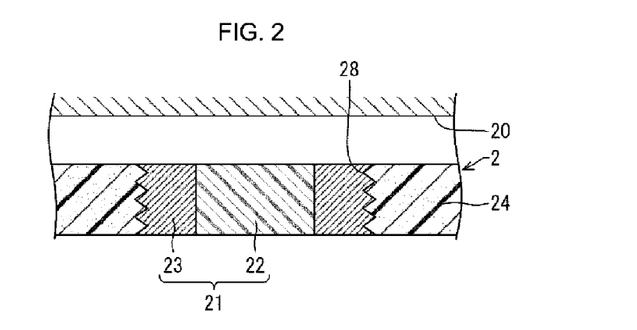
FIG. 2 is an enlarged schematic view of a part of a cross section of a downhole tool to which a modified example 1 of the first aspect of the plug according to an embodiment of the present invention is applied.

A modified example 1 of the first aspect of the plug according to the present embodiment will be described using FIG. 2. FIG. 2 is an enlarged schematic view of a part of a cross section of a downhole tool to which the modified example 1 of the first aspect of the plug according to an embodiment of the present invention is applied. In a downhole tool 2 according to the modified example 1, a third opening part 28 of a tubular main body 24 is plugged by a threaded plug 21 in the same manner as in the downhole tool 1 described above.

As illustrated in FIG. 2, the plug 21 according to a modified example 1 is a plug that closes the opening part in the same manner as the plug 11 described above, the opening part being provided in the circumferential surface of the tubular component and communicating between the inside and the outside of the tubular component. However, the plug 21 according to the modified example 1 differs from the plug 11 in that the plug 21 is composed of a main body part 22 formed of the resin molded article according to the present embodiment and an annular molded article 23 formed of a non-degradable material.

The annular molded article 23 in the modified example 1 is an annular component that covers the periphery of the main body part 22 and has threads on the outer circumferential surface. Here, the main body part 22 is configured to be arranged inside the ring of the annular molded article 23.

The annular molded article 23 in the modified example 1 is formed of a non-degradable material, such as SUS303 and SUS304. Here, the "non-degradable material" refers to a material that does not readily lose weight or thickness in a well environment. The annular molded article 23 is preferably formed of a material that does not substantially lose weight or thickness for 30 days or more in a well.

In the modified example 1, the plug 21 is inserted into the third opening part 28 of the tubular main body 24, and this prevents a flow of a fluid from the inside toward the outside of the tubular main body 24 through the third opening part 28 accordingly. In addition, the main body part 22 of the plug 21, the main body part being composed of the resin molded article, degrades, and this eliminates the third opening part 28 accordingly. Consequently, this causes a flow of a fluid from the inside toward the outside of the tubular main body 24 through the third opening part 28, more specifically, through the inside of the ring of the annular molded article 23.

The size of the main body part 22 may be appropriately set by those skilled in the art in the same manner as the size of the plug 11.

Modified Example 2 of First Aspect

Figure 3:
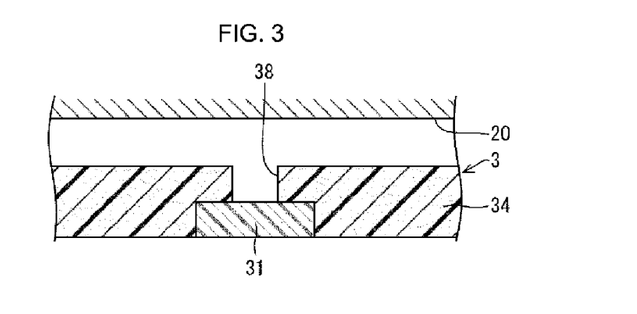
FIG. 3 is an enlarged schematic view of a part of a cross section of a downhole tool to which a modified example 2 of the first aspect of the plug according to an embodiment of the present invention is applied.

A modified example 2 of the first aspect of the plug according to the present embodiment will be described using FIG. 3. FIG. 3 is an enlarged schematic view of a part of a cross section of a downhole tool to which the modified example 2 of the first aspect of the plug according to an embodiment of the present invention is applied. In a tubular main body 34 included in a downhole tool 3 in FIG. 3, a third opening part 38 communicating between an inside and an outside of the tubular main body 34 is provided in a circumferential surface of the tubular main body 34. A plug 31 engages with the inside of the tubular main body 34.

The plug 31, which is the modified example 2 of the first aspect, is applied to a tubular component having an opening part in its circumferential surface, the opening part communicating between an inside and an outside, in the same manner as the plug 11 of the first aspect described above but differs from the plug 11 in that the plug 31 is not inserted into the opening part. The plug 31 of the modified example 2 engages with the tubular component inside the circumferential surface of the tubular component to close the opening part. The plug 31 thus engages with the inside of the tubular main body 34, and the third opening part 38 is closed from the inside accordingly. This prevents a flow of a fluid from the inside toward the outside of the tubular main body 34 through the third opening part 38. In addition, the part composed of the resin molded article in the plug 31 degrades, and this exposes the third opening part 38 accordingly. Consequently, this causes a flow of a fluid from the inside toward the outside of the tubular main body 34 through the third opening part 38.

Second Aspect of Plug

Figure 4:
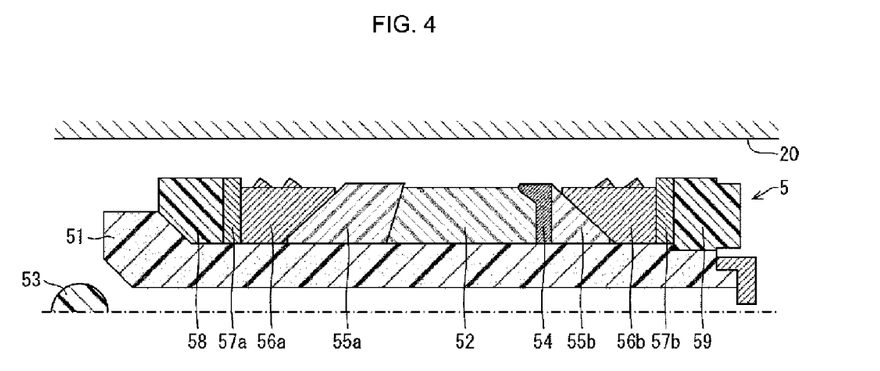
FIG. 4 is a schematic view of a cross section of a downhole plug according to an embodiment of the present invention when the downhole plug is at a predetermined position in a well.

A second aspect of the plug according to the present embodiment includes a downhole plug (downhole tool), such as a frac plug or a bridge plug, that is configured to be inserted into a well. In the downhole plug of the present aspect, the resin molded article according to the present embodiment is used as a downhole tool component, such as a mandrel, a load ring, a cone, a socket, and a bottom, but is not limited to these. Hereinafter, a downhole plug, a second aspect of the plug according to the present embodiment will be described using FIG. 4. FIG. 4 is a schematic view of a cross section of a downhole plug according to an embodiment of the present invention when the downhole plug is at a predetermined position in a well. In FIG. 4, only one of cross sections of the downhole plug that are symmetrical with respect to the axis is illustrated.

A downhole plug 5 illustrated in FIG. 4 has a mandrel 51 corresponding to the tubular component; a ball 53; and a center element 52, a socket 54, cones 55a and 55b, slips 56a and 56b, equalizer rings 57a and 57b, a load ring 58, and a bottom 59. The center element 52, the socket 54, the cones 55a and 55b, the slips 56a and 56b, the equalizer rings 57a and 57b, the load ring 58, and the bottom 59 are all attached to the mandrel 51 to surround an outer circumferential surface of the mandrel 51. The downhole plug 5 has a tubular shape as a whole.

Here, the mandrel 51 functions as a central axis that supports the other components (hereinafter, side parts) disposed on the outer circumference of the mandrel 51 and as a receptor for the ball 53. The center element 52 is an annular rubber component for filling the gap between the mandrel 51 and a well wall 20 in the downhole plug 5, thus isolating the well. The center element 5 is deformed by load.

The socket 54, the cone 55, the slip 56, the equalizer ring 57, and the load ring 58 all are elements for directly or indirectly transferring the load applied from a setting tool to the center element 52 when the downhole plug 5 is operated in the well.

The load ring 58 is a push tool that transfers the load applied from a setting tool to other side parts. The cone 55 has functions of promoting diameter expansion of the slip 56 in the circumferential direction and of compressing the center element 52. The socket 54 has a function of preventing the center element 52 from flowing out to the other side when the well is viewed from the inlet.

The bottom 59 has functions of preventing the downhole plug 5 from operating due to collision with the well wall 20 while the downhole plug 5 is conveyed in the well, and of fixing other side parts when they are set.

3. Application to Well Treatment

The plug described above is a plug that temporarily prevents circulation of a fluid in a well and can be used in well treatment. In the present embodiment, the well is preferably a cased well having a casing.

The well treatment includes:
temporarily isolating one or more areas of at least one of a well or a downhole tool using the plug; and
degrading the resin molded article of the plug to eliminate the isolation and change a flow path of a fluid in the one or more areas. Hereinafter, a case where the first aspect of the plug is applied to the well treatment and a case where the second aspect is applied to the well treatment will be separately described.

In a case where the first aspect of the "2. Specific aspect of plug" described above is applied to well treatment, the area where the plug temporarily isolates a flow path of a fluid is a downhole tool, and specifically, the tubular component that is inserted into the well corresponds to the downhole tool. In this case, the flow path of a fluid is the third opening part provided in the circumferential surface of the tubular component of the downhole tool, the third opening part communicating between the inside and the outside. The flow of a fluid is either a flow of a fluid from the inside toward the outside of the tubular component, that is, the downhole tool, through the opening part, or a flow of a fluid from the outside toward the inside of the downhole tool through the opening part.

In a case where the second aspect of the "2. Specific aspect of plug" described above is applied to well treatment, the flow path of flow temporarily isolated by the plug is a well, and the area temporarily isolated in the flow path of a fluid is a part of the well.

In addition, another aspect of the well treatment includes:
installing the plug in a well to prevent a flow of a fluid in the well; and
degrading the resin molded article constituting the plug to restore the flow of the fluid. In the well treatment, the resin molded article constituting the plug is degraded by water contained in the fluid present in the well, thus eliminating the isolation of the well and restoring the flow of the fluid.

Case of First Aspect

A more specific method of the well treatment using the plug of the first aspect will be described for treatment of washing a well and treatment of stimulating a subterranean formation using the downhole tool illustrated in FIG. 1. The well treatment method using the downhole tool illustrated in FIG. 1 is a well treatment method in a case where the threaded plug 11, which is the plug of the first aspect, temporarily plugs the third opening part 18 provided in the circumferential surface of the tubular main body 14 of the downhole tool 1.

The well is washed by the procedure as follows before fracturing for the purpose of increasing recovery efficiency of hydrocarbon resources. First, the downhole tool 1 is introduced to any position in the well using a fluid or the like. A fluid, such as water, is then injected through the first opening part 16 from the ground to the tubular main body 14, and the fluid is discharged from the second opening part 17 into the well to wash the well. A typical liquid, such as water, oil, or emulsion, is used; in addition, in some cases, the liquid may contain from several ppm to several tens of percent of a salt. At this time, the third opening part 18 is isolated by the plug 11, and thus the fluid injected from the first opening part 16 is not discharged from the third opening part 18. The fluid discharged to the well from the second opening part 17 then passes through the gap between the outside of the downhole tool 1 and the well wall 20 and is recovered on the ground together with sand, scale, or the like deposited on the inner wall of the well.

Here, the third opening part 18 is plugged by the plug 11, and this can prevent the fluid containing sand, scale, and the like after washing the well from entering the inside of the downhole tool through the third opening part 18. Thus, this can prevent a decrease in the efficiency of the washing operation. The important procedure is thus to maintain the plug 11 not to eliminate the plug of the third opening part during the washing operation.

After the washing, when the resin molded article of the plug 11 plugging the third opening part 18 is degraded, the inside and the outside of the tubular main body 14 can be communicated through the third opening part 18. This allows a fluid to circulate between the inside and the outside of the downhole tool 1 through the third opening part 18.

Next, the treatment of stimulating a subterranean formation will be described. The treatment of stimulating a subterranean formation is preferably performed after washing the well, from the viewpoint of increasing recovery efficiency of hydrocarbon resources recovered from a subterranean formation. When a subterranean formation is stimulated, the fluid can preferably circulate between the inside and the outside of the downhole tool 1 through the third opening part.

The procedure for stimulating a subterranean formation is as follows. First, a stimulation fluid to stimulate a subterranean formation is injected from the ground to the tubular main body 14 through the first opening part 16. The injected stimulation fluid is discharged to the well wall 20 through the third opening part 18, and the subterranean formation is stimulated. This stimulation increases the amount of hydrocarbon resources to be recovered from the subterranean formation, and thus this can contribute to increasing production efficiency.

After the treatment of stimulating the subterranean formation, the produced fluid containing hydrocarbon resources flowing from the subterranean formation into the well can be recovered to the ground through the third opening part 18 and the first opening part 16.

The present embodiment provides a plug that has a capability to maintain the isolation function in a plurality of areas of the downhole tool in the well in a high-temperature environment for a desired period of time, and that suitably degrades also in a low salt concentration fluid or water after a lapse of the desired period of time. This further ensures the isolation for the desired period of time and further can reduce a risk of clogging at the isolation position and the like.

Case of Second Aspect

Figure 5:
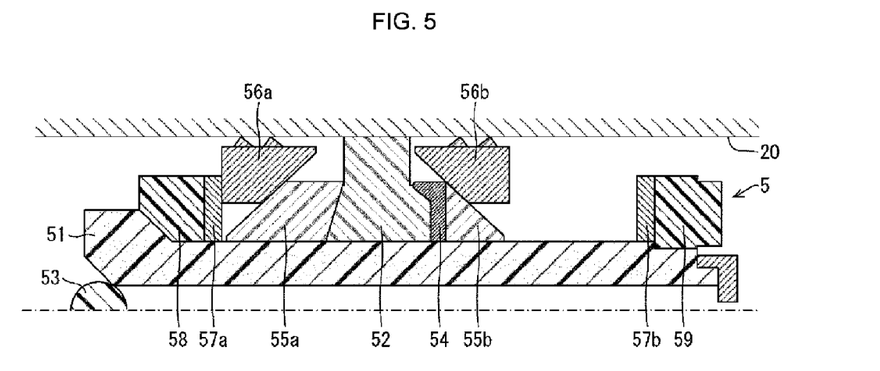
FIG. 5 is a schematic view of a cross section of the downhole plug when the downhole plug isolates the well.

An example of a more specific method of the well treatment using the plug of the second aspect will be described for a method in a case of performing fracturing using the downhole plug illustrated in FIGS. 4 and 5. This is a well treatment method in a case where a downhole plug corresponding to the plug of the second aspect temporarily isolates a well. FIG. 4 is a schematic view of a cross section of a downhole plug according to an embodiment of the present invention when the downhole plug is at a predetermined position in a well. FIG. 5 is a schematic view of a cross section of the downhole plug when the downhole plug isolates the well. In FIGS. 4 and 5, only one of cross sections of the downhole plug that are symmetrical with respect to the axis is illustrated.

First, the downhole plug 5 is introduced from the ground to any position in the well using a fluid or the like. Subsequently, a setting tool is then operated and the center element 52 is deformed as illustrated in FIG. 5, thereby installing and fixing the downhole plug 5 on the well wall 20.

The leading edge of the mandrel 51 of the downhole plug 5 is then closed, and the isolation is completed. Examples of the method of isolation include a method including arranging the ball 53 at the leading edge of the mandrel 51, the ball 53 having been supplied toward the leading edge of the downhole plug 5, to close one end of the mandrel 51, for example, as illustrated in FIG. 5. This allows the downhole plug 5 acting as the boundary to separate the space between the inlet side and the back side of the well. The ball 53 may be arranged at the leading edge of the mandrel 51 by pumping it together with a fluid from the ground.

Then, water or a fluid containing water is injected from the ground, and high pressure is applied to the space of the well, the space being on the inlet side relative to the downhole plug 5, to expand and propagate fracture in the well. Such a method of expanding fracturing by injection of a fluid is referred to as hydraulic fracturing.

After completion of the fracturing, the resin molded article constituting a part or whole of the downhole plug 5 is degraded by bringing the fluid containing water into contact with the downhole plug 5. As a result, the downhole plug 5 loses its original shape, and the isolation of the well is eliminated. The downhole plug 5 including the resin molded article according to the present embodiment is degraded in a high-temperature environment in the well in a desired short period of time, such as, for example, for 5 days to 30 days, and the isolation is eliminated. When the temperature in the well is 80° C. or higher, the isolation is eliminated in a shorter period of time.

The plug according to the present embodiment can maintain the isolation function in a plurality of areas of the well in a high-temperature environment for a desired period of time and can suitably degrade also in a low salt concentration fluid or water after a lapse of the desired period of time. This can perform the isolation more reliably for the desired period of time and further can reduce a risk of clogging at the isolation position and the like.

SUMMARY

As described above, the plug according to the present invention is a plug for temporarily preventing circulation of a fluid in a well, the plug provided with or composed of a resin molded article formed from a polyglycolic acid resin composition containing a polyglycolic acid and a cyclic carbodiimide compound and having a carbodiimide group concentration of 15 eq/t or greater.

In addition, the concentration of a carboxyl end groups of the polyglycolic acid in the polyglycolic acid resin composition is preferably 10 eq/t or less.

In addition, the tensile strength of the resin molded article is preferably 80 MPa or greater.

In addition, the compressive yield stress of the resin molded article is preferably 100 MPa or greater.

In addition, the resin molded article contains a center part and a surface part, and the center part has a weight average molecular weight of 70000 or greater after immersion in water at 80° C. for 48 hours and the surface part has a weight average molecular weight of 20000 or less after immersion in water at 80° C. for 48 hours, and a difference between a thickness of the center part and a thickness of the resin molded article before immersion is preferably 0.1 mm or greater and 2.0 mm or less.

In addition, the plug is preferably a ball, a dart, a disk, or a packer.

In addition, the plug described above is the plug for use in closing an opening part provided in a circumferential surface of a tubular component, the opening part communicating between an inside and an outside of the tubular component, the resin molded article has a first surface and a second surface, and when the plug is used, the first surface is exposed to the outside of the tubular component and the second surface is exposed to the inside of the tubular component, and the shortest distance between the first surface and the second surface is preferably 6 mm or longer and 65 mm or shorter.

In addition, the resin molded article is preferably at least partially covered with a different molded article made of a non-degradable material.

In addition, the above different molded article is an annular molded article having a thread on an outer circumferential surface, and the resin molded article is preferably disposed inside the ring of the annular molded article.

In addition, the plug is preferably a frac plug or a bridge plug.

The downhole tool according to the present invention includes a tubular main body and the plug described above, in which the tubular main body has an opening part in a circumferential surface of the tubular main body, the opening part communicating between an inside and an outside of the tubular main body, and the plug is engaged with the tubular main body to close the opening part.

The well treatment method according to the present invention includes: temporarily isolating one or more areas of at least one of a well or a downhole tool using the plug described above; and degrading the resin molded article of the plug to eliminate the isolation and change a flow path of a fluid in the one or more areas.

The well treatment method according to the present invention includes: temporarily isolating one or more areas of at least one of a well or a downhole tool using the plug described above; and degrading the resin molded article of the plug to eliminate the isolation and change a flow path of a fluid in the one or more areas.

The well treatment method according to the present invention includes: installing the plug described above in a well to prevent a flow of a fluid in the well; and degrading the resin molded article to restore the flow of the fluid.

The well treatment method according to the present invention includes: introducing a downhole tool into a well, the downhole tool having a first opening part at a leading edge and a second opening part at a trailing edge, and further having a third opening part between the leading edge and the trailing edge, the third opening part plugged by the plug described above;
- injecting a fluid from the ground into the downhole tool through the first opening part and discharging the fluid from the second opening part into the well to wash the well; and
- degrading the resin molded article of the plug after the washing and enabling circulation of a fluid between an inside and an outside of the downhole tool through the third opening part.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all the documents described in the present specification are incorporated herein by reference.

EXAMPLES

Productions of resin molded article and tensile test piece

To 100 parts by mass of a polyglycolic acid ("Kuredux 100R90" available from Kureha Corporation, weight average molecular weight (Mw): 210000), 0, 1, 3, 5, or 20 parts by mass of a cyclic carbodiimide ("Carbosista (trade name)" available from Teijin Limited, grade "TCC-NP") was blended and mixed. The mixture was supplied to a feed part of a twin-screw extrusion kneader set at a screw section temperature of 210° C. to 240° C. and melt kneaded, and a pellet-formed polyglycolic acid resin composition was obtained. Two samples were prepared with the same formulation for the pellet of the polyglycolic acid resin composition in which 5 parts by mass of the cyclic carbodiimide was blended to 100 parts by mass of the polyglycolic acid.

The pellet of the polyglycolic acid resin composition was fed into an injection molding machine set at a screw section temperature of 210 to 255° C., and injection-molded under a condition of a mold temperature of 100° C., and a cubic resin molded article with a side width of 12.5 mm and a dumbbell-shaped tensile test piece were obtained.

Measurement of Concentration of Carboxyl End Groups in Polyglycolic Acid

The concentration of the carboxyl end groups of the polyglycolic acid used was calculated by titration using a neutralization reaction. First, 100 mg of the polyglycolic acid resin composition in the pellet form was weighed into a vial, and 10 mL of a dehydrated DMSO was further added. The vial was immersed in an oil bath at 160° C. and heated, and the pellet was dissolved. The vial was then cooled to normal temperature, and 10 µL of a 1% BTB/DMSO solution was added. A 0.001 mol/L solution of 1,8-diazabicyclo[5,4,0]undec-7-ene in DMSO was then added dropwise as an alkaline solution while the color change was observed using a spectrophotometer. The dropwise addition was terminated when the color of the mixed solution no longer changed, and the concentration of the carboxyl end groups was calculated from the amount of the alkaline solution added dropwise. The results are shown in Table 1.

Degradation Test

A degradation test of the resin molded article was performed according to (1) to (5) below, and the rate of reduction in thickness and the degradation lead time were calculated. The results are shown in Table 1.

(1) The cubic resin molded article produced was annealed at 120° C. for five hours, and then the length, width, and height of the resin molded article were measured.

(2) In a 50-mL vial, 50 mL of deionized water was charged, and the vial was allowed to stand in a thermostatic vessel at 80° C. to keep water at 80° C. in advance.

(3) The resin molded article was placed into the vial of (2) and immersed in 50 ml of deionized water. The vial was then allowed to stand in a thermostatic vessel at 80° C., and the resin molded article was taken out after a lapse of a predetermined period of time.

(4) The resin molded article taken out was allowed to stand in an oven at 80° C. in the atmospheric pressure for two hours and dried. Then, a brittle layer of the resin molded article was scraped off, and the length, width, and height of the remaining part were measured. The brittle layer was removed by scraping off using a cutter.

(5) The acquired data were plotted to create a graph with the horizontal axis for time (hr) and the vertical axis for the decrement of thickness, and the slope of the straight line calculated by the least squares method and the intersection of the straight line with the horizontal axis (intercept of the horizontal axis) were determined. The obtained slope of the straight line was the rate of reduction in thickness (µm/hr), and the intercept of the horizontal axis was the degradation lead time (hr). Here, the decrement of thickness was an average of the differences in the length, width, and height of the resin molded article between before and after the immersion. A plot with a decrement of thickness of 0.01 mm or less might have included a dimensional measurement error and thus was excluded from the calculation.

Measurements of Content of Cyclic Carbodiimide Compound and Carbodiimide Group Concentration The resin molded article produced and dimethyl sulfone as an internal standard substance were heated and dissolved in DMSO-d6 at 160° C. for two minutes. The solution was cooled to room temperature after dissolution, the liquid content was filtered, and the content of the cyclic carbodiimide compound and the carbodiimide group concentration were measured by 1H NMR.

Tensile Test

To measure a stress at the tensile maximum point of the resin molded article produced, a tensile test was performed. The tensile test was measured by using a type 1A tensile test piece and subjecting the tensile test piece to tensile stress at a rate of 50 mm/min in an environment of 23° C. in accordance with ISO 527. The results are shown in Table 1.

Measurement of Compressive Yield Stress

The compressive yield stress of the resin molded article was measured. The measurement was performed by cutting the resin molded article into a 5-mm side cube and subjecting the cube to compressive stress at a rate of 1 mm/min with a compression tester in an environment of 23° C. The results are shown in Table 1.

[Table 1]

TABLE 1

|  |  | Examples | | | | Comparative Examples | |
| --- | --- | --- | --- | --- | --- | --- | --- |
|  |  | 1 | 2 | 3 | 4 | 1 | 2 |
| Resin composition formulation (parts by mass) | PGA | 100 | 100 | 100 | 100 | 100 | 100 |
|  | Carbosista | 3 | 5 | 20 | 5 | 0 | 1 |
| COOH end group concentration of polyglycolic acid (eq/t) |  | 6.0 | 4.7 | — | 4.4 | 10.3 | 6.1 |
| Rate (μm/hr) of reduction in thickness in water at 80° C. |  | 60.2 | 41.4 | 36.9 | 49.8 | 64.2 | 64.1 |
| Degradation lead time (hr) in water at 80° C. |  | 16 | 34 | 37 | 15 | 16 | 12 |
| Content (wt. %) of cyclic carbodiimide compound |  | 0.47 | 2.33 | — | 1.43 | 0.00 | 0.08 |
| Carbodiimide group concentration (eq/t) |  | 18.2 | 90.3 | — | 55.4 | 0.00 | 3.10 |
| Tensile maximum point stress (MPa) |  | — | 120 | 112 | — | 101 | — |
| Compressive yield stress (MPa) |  | 148 | 155 | — | 186 | 171 | 165 |

Comparison of Examples 2 and 4 revealed that even though the same amount of the cyclic carbodiimide compound was added in each, the rate of reduction in thickness was smaller in Example 2, in which the composition contained a greater amount of the cyclic carbodiimide compound, than in Example 4. This is probably because more of the cyclic carbodiimide compound reacted with the carboxyl groups at the end of the polyglycolic acid in Example 4, resulting in smaller carboxyl end group concentration of the polyglycolic acid and smaller carbodiimide group concentration in the composition than in Example 2.

REFERENCE SIGNS LIST 1, 2, 3: Downhole tool
5: Downhole plug
11, 21, 31: Plug
14, 24, 34: Tubular main body
16: First opening part
17: Second opening part
18, 28, 38: Third opening part
20: Well wall
22: Main body part
23: Annular molded article
51: Mandrel
52: Center element
53: Ball
54: Socket
55, 55a, 55b: Cone
56, 56a, 56b: Slip
57, 57a, 57b: Equalizer ring
58: Load ring
59: Bottom
121: First surface
122: Second surface

The invention claimed is:

1. A plug for temporarily preventing circulation of a fluid in a well, the plug comprising or composed of a resin molded article, the resin molded article being formed from a polyglycolic acid resin composition containing a polyglycolic acid and a cyclic carbodiimide compound and having a carbodiimide group concentration of 15 eq/t or greater, and the polyglycolic acid resin composition containing 0.4 mass % or greater of the cyclic carbodiimide compound; wherein the resin molded article comprises a center part and a surface part, the center part having a weight average molecular weight of 70000 or greater after immersion in water at 80° C. for 48 hours and the surface part having a weight average molecular weight of 20000 or less after immersion in water at 80° C. for 48 hours, and a difference between a thickness of the center part and a thickness of the resin molded article before immersion is 0.1 mm or greater and 2.0 mm or less.

2. The plug according to claim 1, wherein a concentration of carboxyl end groups of the polyglycolic acid is 10 eq/t or less.

3. The plug according to claim 1, wherein a tensile strength of the resin molded article is 80 MPa or greater.

4. The plug according to claim 1, wherein a compressive yield stress of the resin molded article is 100 MPa or greater.

5. The plug according to claim 1, wherein the plug is a ball, a dart, a disk, a screw, or a packer.

6. The plug according to claim 1, wherein
   the plug is for use in closing an opening part provided in a circumferential surface of a tubular component, the opening part communicating between an inside and an outside of the tubular component,
   the resin molded article has a first surface and a second surface, and when the plug is used, the first surface is exposed to the outside of the tubular component and the second surface is exposed to the inside of the tubular component, and
   the shortest distance between the first surface and the second surface is 6 mm or greater and 65 mm or smaller.

7. The plug according to claim 1, wherein the resin molded article is at least partially covered with another molded article made of a non-degradable material.

8. The plug according to claim 7, wherein the another molded article is an annular molded article having a thread on an outer circumferential surface, and the resin molded article is disposed inside a ring of the annular molded article.

9. The plug according to claim 1, wherein the plug is a frac plug or a bridge plug.

10. A downhole tool comprising a tubular main body and the plug described in claim 1, wherein
the tubular main body has an opening part in a circumferential surface of the tubular main body, the opening part communicating between an inside and an outside of the tubular main body, and
the plug is engaged with the tubular main body to close the opening part.

11. A well treatment method comprising:
temporarily isolating one or more areas of at least one of a well or a downhole tool using the plug described in claim 1; and
degrading the resin molded article of the plug to eliminate the isolation and to change a flow path of a fluid in the one or more areas.

12. A well treatment method comprising:
installing the plug described in claim 1 in a well to prevent a flow of a fluid in the well; and
degrading the resin molded article to restore the flow of the fluid.

13. A well treatment method comprising:
introducing a downhole tool into a well, the downhole tool having a first opening part at a leading edge and a second opening part at a trailing edge, and further having a third opening part between the leading edge and the trailing edge, the third opening part plugged by the plug described in claim 1;
injecting a fluid from a ground into the downhole tool through the first opening part and discharging the fluid from the second opening part into the well to wash the well; and
degrading the resin molded article of the plug after the washing and enabling circulation of a fluid between an inside and an outside of the downhole tool through the third opening part.

* * * * *